(12) United States Patent  (10) Patent No.: US 8,638,255 B2
Muehlmann  (45) Date of Patent: Jan. 28, 2014

(54) SYSTEM FOR READING INFORMATION TRANSMITTED FROM A TRANSPONDER

(75) Inventor: Ulrich Muehlmann, Graz (AT)

(73) Assignee: NXP B.V., Eindhoven (NL)

(*) Notice: Subject to any disclaimer, the term of this patent is extended or adjusted under 35 U.S.C. 154(b) by 317 days.

(21) Appl. No.: 13/056,382

(22) PCT Filed: Jul. 30, 2009

(86) PCT No.: PCT/IB2009/053322
§ 371 (c)(1),
(2), (4) Date: Jan. 28, 2011

(87) PCT Pub. No.: WO2010/013215
PCT Pub. Date: Feb. 4, 2010

(65) Prior Publication Data
US 2011/0122015 A1 May 26, 2011

(30) Foreign Application Priority Data
Jul. 30, 2008 (EP) .................................... 08104924

(51) Int. Cl.
*G01S 13/75* (2006.01)
(52) U.S. Cl.
USPC .............................. 342/118; 342/42; 340/10.1
(58) Field of Classification Search
USPC .............................................. 342/42–51, 118
See application file for complete search history.

(56) References Cited

U.S. PATENT DOCUMENTS

| 6,686,881 | B1 | 2/2004 | Lu et al. |
| 6,943,725 | B2 | 9/2005 | Gila et al. |
| 7,319,396 | B2* | 1/2008 | Homanfar et al. ......... 340/572.1 |
| 2005/0273218 | A1* | 12/2005 | Breed et al. ...................... 701/2 |
| 2006/0012475 | A1 | 1/2006 | Froitzheim et al. |
| 2007/0046430 | A1 | 3/2007 | Yamazaki et al. |
| 2007/0285245 | A1* | 12/2007 | Djuric et al. .............. 340/572.1 |
| 2012/0268308 | A1* | 10/2012 | Tuttle .............................. 342/42 |

OTHER PUBLICATIONS

International Search Report for Intl Application PCT/IB2009/053322 (Jan. 13, 2010).

* cited by examiner

*Primary Examiner* — Matthew M Barker

(57) ABSTRACT

A reader device (110) for reading information transmitted from a transponder (130) via a backscatter signal (132) generated by the transponder (130) in response to a stimulus signal (112) generated by the reader device (110), the reader device (110) comprising a first power estimation unit (114) adapted for estimating a first power value indicative of the power of the stimulus signal (112) at a position of the transponder (130) by evaluating a power information included in the backscatter signal (132), a second power estimation unit (116) adapted for estimating a second power value indicative of the power of the backscatter signal (132) at a position of the reader device (110), and a distance estimation unit (118) adapted for estimating a distance ($d_1$) between the reader device (110) and the transponder (130) based on the first power value and the second power value.

12 Claims, 1 Drawing Sheet

SYSTEM FOR READING INFORMATION TRANSMITTED FROM A TRANSPONDER

FIELD OF THE INVENTION

The invention relates to a reader device for reading information transmitted from a transponder.

The invention further relates to a transponder.

Furthermore, the invention relates to a communication system.

Moreover, the invention relates to a method of reading information transmitted from a transponder.

Beyond this, the invention relates to a program element.

Furthermore, the invention relates to a computer-readable medium.

BACKGROUND OF THE INVENTION

The importance of automatic identification systems increases particularly in the service sector, in the field of logistics, in the field of commerce and in the field of industrial production. Further applications of identification systems are related to the identification of persons and animals.

In particular contactless identification systems like transponder systems (for instance using an RFID tag) are suitable for a wireless transmission of data in a fast manner and without cable connections that may be disturbing. Such systems use the emission and reflection/absorption of electromagnetic waves, particularly in the high frequency domain.

A shortcoming of the RFID technology is that undesired cross-talk may occur when multiple tags are to be read by multiple gates or readers.

U.S. Pat. No. 6,943,725 discloses an access control system for an object, particularly a motor vehicle, which comprises at least one base station with a transceiver device that transmits a wideband modulated interrogation signal, at least one transponder that has a modulation device, in order to modulate an auxiliary carrier signal, the frequency of which is changed between an infinite number of frequency positions, onto an interrogation signal received at a distance from the base station and reflect it as a code-modulated response signal, and an evaluation device that is connected after the transceiver device and that evaluates the response signal in sidebands of the changed frequency positions, with respect to code and distance.

OBJECT AND SUMMARY OF THE INVENTION

It is an object of the invention to read information from a transponder with high precision.

In order to achieve the object defined above, a reader device for reading information transmitted from a transponder, a transponder, a communication system, a method of reading information transmitted from a transponder, a program element and a computer-readable medium according to the independent claims are provided.

According to an exemplary embodiment of the invention, a reader device (particularly adapted for cooperating with a transponder having the below-described properties) for reading information transmitted from a transponder via (or by) a backscatter signal (such as secondary electromagnetic radiation) generated (or modulated and reflected) by the transponder in response to a stimulus signal (such as primary electromagnetic radiation) generated (or emitted) by the reader device is provided, the reader device comprising a first power estimation unit (which may have signal processing capability) adapted for estimating a first power (or energy) value indicative of the power of the stimulus signal at a position of the transponder by evaluating a power information included in the backscatter signal, a second power estimation unit (which may have signal processing capability) adapted for estimating a second power value indicative of the power of the backscatter signal at a position of the reader device, and a distance estimation unit (which may have signal processing capability) adapted for estimating a (spatial) distance between the reader device and the transponder based on the first power value and the second power value.

According to another exemplary embodiment of the invention, a transponder (particularly adapted for cooperating with a reader device having the above-described properties) for transmitting information to a reader device via a backscatter signal generated by the transponder in response to a stimulus signal generated by the reader device is provided, the transponder comprising a backscatter signal generation unit (which may have signal processing capability) adapted for generating the backscatter signal based on the stimulus signal including power information indicative of the power of the stimulus signal at a position of the transponder.

According to still another exemplary embodiment of the invention, a communication system is provided which comprises a transponder having the above mentioned features for transmitting information to a reader device, and a reader device having the above mentioned features for reading information transmitted from the transponder.

According to still another exemplary embodiment of the invention, a method of reading, by a reader device, information transmitted from a transponder via a backscatter signal generated by the transponder in response to a stimulus signal generated by the reader device is provided, the method comprising estimating a first power value indicative of the power of the stimulus signal at a position of the transponder by evaluating a power information included in the backscatter signal, estimating a second power value indicative of the power of the backscatter signal at a position of the reader device, and estimating a distance between the reader device and the transponder based on the first power value and the second power value.

According to still another exemplary embodiment of the invention, a program element (for instance a software routine, in source code or in executable code) is provided, which, when being executed by a processor, is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor, is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "distance" may denote a physical spacing between a transponder and a reader device.

The term "reader device" may denote a base station adapted for sending an electromagnetic radiation beam for reading out a transponder and detecting a back reflected signal. Such a reader device may be an RFID reader, for instance.

The term "transponder" may particularly denote an RFID tag or a (for instance contactless) smartcard. More generally, a transponder may be a device (for instance comprising a chip) which may automatically transmit certain (for example coded) data when activated by a special signal from an interrogator.

According to an exemplary embodiment of the invention, a communication system is provided in which a reader device is capable of estimating a distance to a transponder presently communicating with the reader device. This distance may be estimated on the basis of an evaluation of two power values. Firstly, a power value of electromagnetic radiation generated by the reader device at the position of the transponder, thus after being influenced by the transmission channel. This power value can be evaluated when the transponder includes or encodes this piece of information intentionally or unintentionally into a backscattering signal which the transponder scatters back to the reader device after having received the stimulating electromagnetic radiation. Secondly, the power of the backscatter signal at the position of the reader device may be evaluated by the reader device for instance by measuring an amplitude or an intensity of the backscatter signal. A comparison of these power values, if desired in combination with a model for the transmission channel (particularly modelling losses over such a transmission channel) allows the reader device to accurately estimate a distance between the reader device and the transponder. Generally, the larger the distance, the larger are the losses across the transmission channel and the larger is the difference between the power at the position of the transponder and the power at the position of the reader device. For instance, scaling factors or a plausible transmission channel model may be included in such an evaluation scheme to arrive at meaningful results. When the reader device has estimated the distance, the reader device may decide (for instance by comparison of the estimated distance with a threshold value) whether the communication with the transponder really relates to a desired communication or whether an undesired crosstalk with a remotely located transponder occurs.

Next, further exemplary embodiments of the reader device will be explained. However, these embodiments also apply to the transponder, to the communication system, to the method, to the program element and to the computer-readable medium.

The first power estimation unit may be adapted for estimating the first power value by evaluating the backscatter signal based on a predefined nonlinear transfer function of an available power versus modulation efficiency by which the stimulus signal is manipulated by the transponder. The transponder may encode the power value at the transponder's present position when there is a clear unambiguous correlation between the signal incorporated in the backscatter signal and the distance. A nonlinear transfer function of an available power versus modulation efficiency is appropriate for this (compare FIG. 2). A corresponding encoding scheme may be preknown by (or agreed between) both the reader device and the transponder.

The first power estimation unit may be adapted for estimating the first power value by evaluating a clock rate of the backscatter signal manipulated by the transponder. In accordance with this, the backscatter signal generation unit may be adapted for generating the backscatter signal by manipulating the stimulus signal with a clock rate in accordance with the power of the stimulus signal at a position of the transponder. Thus, the tag may vary the backscatter clock rate according the instant available power at a current tag position. The corresponding transfer function may be known by the reader. In other words, the first power information may be encoded in a clock frequency of the tag.

The second power estimation unit may be adapted for estimating the second power value by determining a received signal strength of the backscatter signal at a position of the reader device. When the reader device determines the amplitude or intensity of the backscatter signal at a position of a receiver antenna, this value may be an indicator for the power of the backscatter signal at this position.

The distance estimation unit may be adapted for estimating the distance between the reader device and the transponder by applying a path-loss-model which may correlate the first power value and the second power value with the distance between reader device and transponder. Such a path-loss-model may be a theoretical, a phenomenological or an experimentally derived model (or a combination thereof) correlating the loss of intensity of electromagnetic radiation with a distance of an assigned transmission path. Along propagation of an electromagnetic radiation along a transmission channel, intensity is usually lost so that distance and intensity may be closely correlated parameters. A path loss model may also consider different scenarios regarding the tag, for instance a tag being attached to a substrate such as a pallet, or a free tag. Distance estimation based on a path-loss model may include a channel estimation procedure. A path loss model may consider as well a statistical distribution of signal components of a backscatter signal.

The reader device may comprise a determination unit adapted for determining (or deciding) whether the backscattering signal belongs to a communication between the reader device and the transponder based on the evaluated distance. A decision criteria may be whether the detected distance is smaller/equal (acceptance of the signal) or is larger (rejection of the signal) than a predefined threshold value. In a scenario, in which various reader devices and various transponders are present, it may be important for a reader device to determine whether a communication message received from a particular transponder really relates to the present communication system. The distance between the reader device and the transponder may be an easily determinable and reliable parameter indicating whether a signal received by a reader device really originates from an assigned transponder.

The reader device may comprise a decoding unit adapted for decoding information encoded in the backscattering signal only upon previous determination, by the determination unit (or decision unit), that the backscattering signal belongs to a communication between the reader device and the transponder. In an embodiment, the decoding unit will only start decoding after successful identification or recognition that a specific signal is really addressed to the present reader device. This may save processing capabilities and may avoid unnecessary processing of signals, which are not addressed by the reader device.

Embodiments of the invention allow for a precise and reliable estimation of the relative spatial arrangement between reader device and transponder. Such position/distance information may be used by the reader device for control purposes. For instance, the distance information can be used for a decision whether a detected communication between transponder and reader device is intentional and the corresponding communication message is meaningful for the reader device since their distance is less than a predefined threshold value (for instance 5 m). If the distance is measured to be larger than the predefined threshold value, the reader device may reason that no communication is intended between the reader device and the transponder. The latter scenario my occur in an arrangement of multiple reader devices and multiple transponders when undesired crosstalk between the various communication channels may occur. In this situation, it may be advantageous that each reader device can distinguish between significant and insignificant signals on the basis of the knowledge of the spatial distance of a source of a respective communication message. Additionally or alternatively, it is also possible to control communication parameters between reader device and transponder in accordance with a measured distance, for instance to adjust an emission power in accordance with the detected orientation between transponder and reader device.

In an embodiment, a conventional transponder may be combined with a reader device having the above-mentioned properties. In such an embodiment, a "parasitic" influence of the power provided by the reader device on the properties of the backscatter signal may be used to derive, by the reader device, the local power information at the position of the transponder. Due to intrinsic backscatter signal generation processes of a transponder, the working point of the transponder is shifted when the available operation power of the tag is changed.

In another embodiment, the implemented transponder may be adapted specifically to intentionally modulate the backscatter signal in accordance with the power provided by the reader device. In such an embodiment, the backscatter signal may encode the local power in a clock rate, in an amplitude, etc. A corresponding encoding scheme may be known or agreed by both the reader device and the transponder in such an embodiment.

Particularly, the reader device may be adapted as an ultra high-frequency (UHF) long-range reader device. Specifically in such a scenario it may be important for a reader device to distinguish between signals belonging to the reader device and signals from other transponders which are not relevant for the reader device. A corresponding carrier frequency may be, for instance, between 840 MHz and 960 MHz. However, this is only an example, and other embodiments may use other frequencies, for instance 50 MHz.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
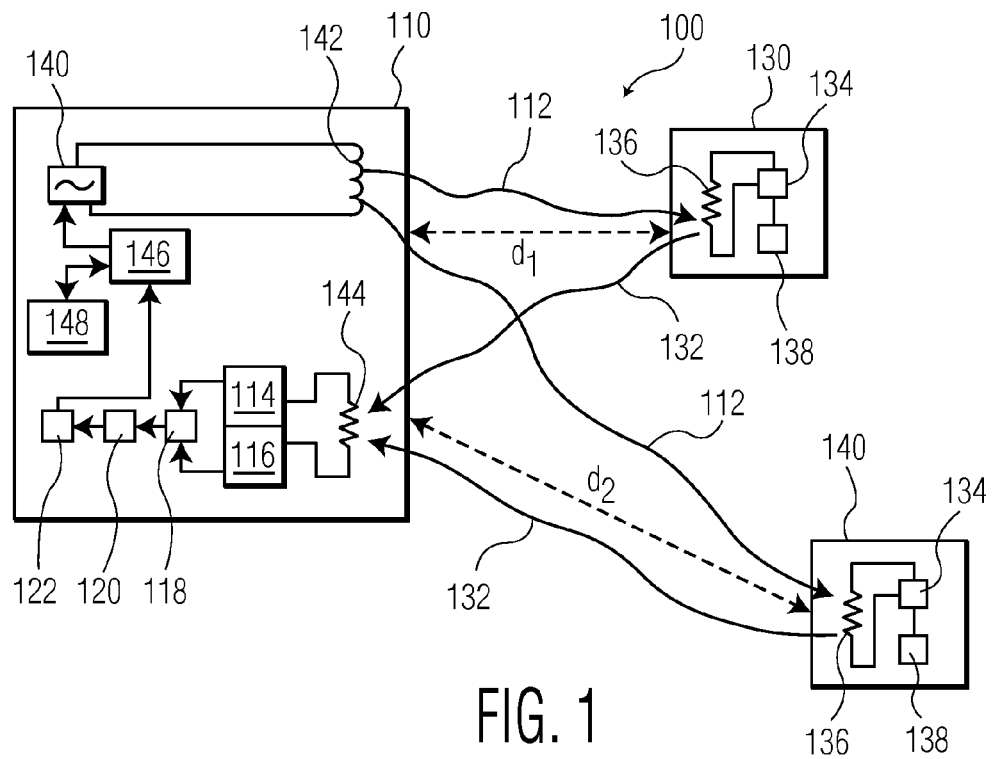
FIG. 1 illustrates a communication system according to an exemplary embodiment of the invention showing a communication between a reader device and two transponders.

The illustration in the drawing is schematically. In different drawings, similar or identical elements are provided with the same reference signs.

In the following, referring to FIG. 1, a communication system 100 according to an exemplary embodiment of the invention will be explained.

The communication system 100 comprises a reader device 110 for reading information transmitted from a transponder 130. Although only the transponder 130 is intended to communicate with the reader device 110 in the present scenario, it may happen under undesired circumstances (for instance in an environment in which a plurality of transponders and reader devices are present) that also a further transponder 140 which is not intended for a communication with the reader device 110 backscatters electromagnetic radiation emitted by the reader device 110. This may result in undesired crosstalk between different communication channels, as will be explained in the following.

Embodiments of the invention allow the reader device 110 to distinguish between signals originating from the transponder 130 (intended for a communication with the reader device 110) and signals originating from the transponder 140 (not intended for a communication with the reader device 110). As a criteria for this distinction, different distances $d_1$ of the transponder 130 from the reader device and $d_2$ of the transponder 140 from the reader device 110 may be taken into account, as will be explained below in more detail.

The communication system 100 is adapted for performing a measurement of the distances $d_1$, $d_2$ between the base station 110 and the corresponding transponders 130, 140. The backscattering transponders 130, 140 do not have their own power source, but are powered by and reflect back a primary electromagnetic signal 112 they receive from the reader device 110 as a secondary electromagnetic signal 132 with or without previous amplification. Knowledge of the distances $d_1$, $d_2$ can be used, for example, for access control or the determination whether a received signal is really addressed to the reader device 110, and not to another reader device.

The reader device 110 comprises an oscillator unit 140 for generating an oscillating signal having a specific frequency, namely a carrier frequency of, for instance, 925 MHz. An output of the oscillator unit 140 is connected to a transmission antenna 142 which emits the electromagnetic radiation beam 112 with the carrier frequency. In the described embodiment, the transmission antenna 142 is provided separately from a reception antenna 144. In alternative embodiments, it is also possible that the transmission antenna 142 is also used for reception.

Under the control of a control unit 146 of the reader device 110, the oscillation unit 140 may be triggered to generate an oscillation, and the connected transmission antenna 142 will emit the electromagnetic radiation beam 112, which may be an ultra high-frequency beam. The control unit 146 may be a microprocessor or a central processing unit (CPU).

The reader device 110 further comprises an input/output unit 148 adapted for a bidirectional communication with the control unit 146. The input/output unit 148 may comprise input elements such as a keypad, buttons, a joystick, etc. and may also have a display unit such as liquid crystal display (LCD) for displaying information related to the operation of the reader device 110 to a user.

The transponder 130 comprises a transceiver antenna 136 which is adapted to receive the electromagnetic radiation beam 112 emitted by the transmission antenna 142. A control unit 134 of the transponder 130 may be a microprocessor chip having processing capabilities, particularly modulating capabilities. The control unit 134 may also have access to an optional memory unit 138 for storing information, for instance an EEPROM. In accordance with a communication message to be transmitted from the transponder 130 to the reader device 110 after being activated by the interrogation and power supply signal 112, a reflection transistor (not shown) of the transponder 130 may manipulate/modulate the received signal 112 before reflection or reemission by the antenna 136. In accordance with this, the response signal 132 can be reflected from the transponder 130 and can propagate back to the reader device 110.

The transponder 140, which is actually not intended for a communication with the reader device 110, has a similar construction as the transponder 130.

Although not shown in the figures, the transponders 130, 140 may or may not comprise an additional oscillator.

The present inventor has recognized that an exchange of information between the reader device 110 and the transponder 130 in combination with a power analysis capability of the reader device 110 may allow the reader device 110 to estimate a distance $d_1$ between the transponder 130 and the reader device 110, and the distance $d_2$ between the transponder 140 and the reader device 110.

More particularly, the control unit 134 of the transponder 130 serves as a backscatter signal generation unit adapted for generating the backscatter signal 132 based on the stimulus signal 112 so that the backscatter signal 132 includes power information indicative of the power of the stimulus signal 112 at a spatial position of the transponder 130. When the stimulus signal 112 propagates from the reader device 110 to the transponder 130, energy and power may be lost. Thus, the power measured at the position of the transponder 130 is a first indicator of the distance $d_1$. When the control unit 134 modulates the incoming signal 112 for reflection towards the reader device 110, the transponder 130 will manipulate the stimulus signal 112 in accordance with a nonlinear transfer function of an available power versus modulation efficiency to thereby encode, within the backscatter signal 132, the power of the stimulus signal 112 at the position of the transponder 130.

A similar functionality is included in the transponder 140.

When the backscatter signal 132 has been reflected towards the reader device 110, the receiver antenna 144 will detect this signal 132 and will forward a content of the signal 132 to power estimation units 114, 116 for, in this embodiment, parallel processing.

The first power estimation unit 114 is adapted for estimating a first power value indicative of the power of the electromagnetic stimulus signal 112 at the position of the transponder 130 by evaluating a power information included in the backscatter signal 132. As mentioned above, the transponder 130 has indicated or encoded within the backscatter signal 132 the value of the available power of the stimulus signal 112 at the position of the transponder 130.

Furthermore, the second power estimation unit 116 is adapted for estimating a second power value indicative of the power of the backscatter signal 132 at a spatial position of the reader device 110. Thus, the power of the backscatter signal 132 as received by the antenna 144 can be determined by the second power estimation unit 116.

The two pieces of information provided by the power estimation units 114, 116 may be supplied to a distance estimation unit 118 adapted for estimating a distance $d_1$ between the reader device 110 and the transponder 130 based on the first power value and the second power value. In a similar manner, the distance estimation unit 118 further estimates a distance $d_2$ between the reader device 110 and the transponder 140 based on the corresponding power values measured for this transponder 140.

The distance estimation unit 118 applies a predefined path-loss-model modelling a manner as to how the stimulus signal 112 is weakened (or attenuated) when propagating along a distance $d_1$ and as to how the backscatter signal 132 is weakened (or attenuated) when propagating from the transponder 130 to the reader device 110.

The result of this distance estimation is supplied to a determination unit 120 adapted for determining whether the backscattering signal 132 belongs to a communication between the reader device 110 and the transponder 130 based on the evaluated distance $d_1$. When the measured distance $d_1$ is smaller than a predefined threshold distance, for instance 5 m, this signal will be accepted and will be supplied to a decoding unit 122 for subsequently decoding information encoded in the backscattering signal 132.

In an embodiment, in which the transponder 130 is attached to a product to be purchased, for instance in a supermarket, this information may be the price of the product to which the transponder 130 is attached. In this example, the further transponder 140 may be attached to a product which is not purchased by a buyer, but by another buyer queuing at another cash-desk when the cash-desk formed by the reader device 110.

Thus, the communication system 110 serves as a range estimator to detect the distance between UHF transponder 130 and reader 100 based on an analysis of the backscatter signal 132.

Figure 2:
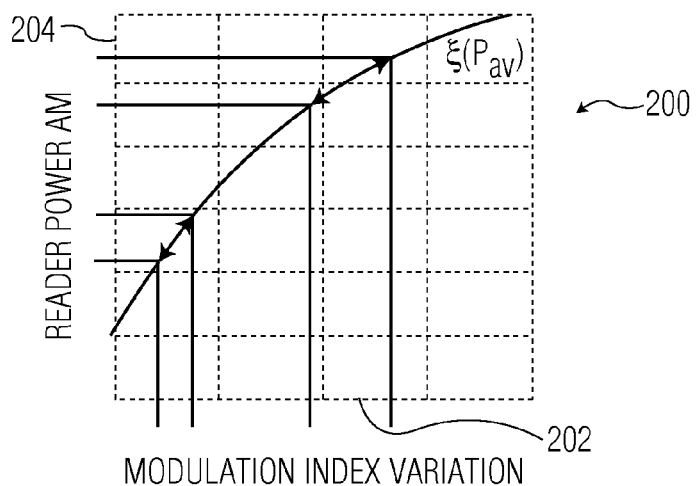
FIG. 2 is a diagram illustrating a relation between a modulation index variation and a reader power accessible to a transponder according to an exemplary embodiment of the invention.

FIG. 2 shows a diagram 200 having an abscissa 202 along which a modulation index variation is plotted, and having an ordinate 204 along which a reader power is plotted. The shown curve provides for a nonlinear modulation function of the transponder 130.

Figure 3:
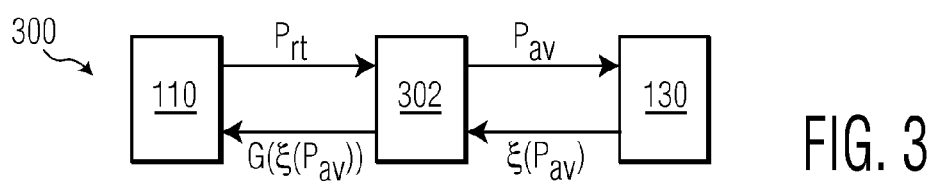
FIG. 3 shows a schematic illustration of a communication path between a reader device and a transponder via a transmission channel according to an exemplary embodiment of the invention.

FIG. 3 is a schematic representation of a communication path 300 between the reader device 110 and the transponder device 130. The reader device 110 and the transponder device 130 communicate in a bidirectional manner via a transmission channel 302, which is shown in FIG. 3 as well. The various power values, P, along the transmission channel 302 are indicated as well in FIG. 3.

In the following, further details regarding read zone management based on location fingerprinting in RFID according to an exemplary embodiment of the invention will be explained.

The nature of UHF long-range RFID systems can conventionally lead to the reading of unwanted tags in adjacent gates or doors. Hence, it would be desirable that some sort of read zone management should be applied in order to detect weather or not a tagged item belongs to a particular read point.

According to an exemplary embodiment of the invention, location fingerprinting is used to detect the location of the identified tags. Such a scheme may involve two phases:

In a first phase, the available power for the tag is estimated (which may be denoted as a calibration).

The backscattered modulated power of the tag depends on the available tag power. In order to generate a path-loss model, it may be advantageous to know the available tag power. The only information gained in UHF RFID is the property of the backscattered signal. In this sense, location fingerprinting may be based on the characteristics of the received backscattered signal at the reader.

During backscatter modulation, the reader does a slight low-frequency modulation of the transmitted power in a, for instance, sinusoidal, triangle, or saw-tooth manner. Due to the assumed linear behaviour of the transmit channel, this power variation will be seen by the tag. The tag itself contains a nonlinear transfer function of the available power versus modulation efficiency. This nonlinear transfer function can be an exponential function, a square function ($x^2$), a square root function, or other polynomial functions with known behaviour. The tag basically varies the impedance of the chip associated with the incident energy, which is proportional to the available power ($P_{av}$). On the way back to the reader, the backscattered modulated power passes through the receive channel before it reaches the receiver of the reader. It can be assumed in proper approximation that both channels have equal properties since the tag and reader operate as transceivers with transmitter and receiver at the same location.

The reader performs some sort of differentiation operation along the received signals that may cancel or reduce the influence of the linear transmit and receive channel. Furthermore, the differential of the nonlinear transfer function is used to solve for the effective available tag power.

In a second phase, a location fingerprinting scheme may be applied (which may be denoted as an estimation).

In order to perform some sort of read zone management, the location fingerprinting can be performed. In principle, a transfer function between the fingerprint space and the actual physical location of the tag should be found. One possible solution is the usage of the statistical properties of the received-signal-strength (RSS) at the reader in order to map the RSS to a probabilistic channel path-loss model (for instance Log-normal, Rayleigh, Rice, etc.).

Another embodiment is based on a Maximum-Length-Sequence (MLS) Pilot symbol generated by the tag. MLS signals have particular properties that can be used to determine the impulse response or the channel characteristics from tag to reader, respectively. MLS signals may be signals having a noise section or a random section of a specific length and may be generated by a shift register or the like.

The mathematic formulation of these models in combination with the estimated $P_{av}$ may be used to estimate the distance metrics or transfer function, respectively. Then, a threshold may be used to make decision weather or not the identified tag is located inside or outside a specified read zone. The set of probabilistic path-loss models as well as the $P_{av}$ estimation may require an offline train phase to identify the properties of the environment and to characterize the produced fingerprint of the tag at all proper locations (for instance, close proximity, far away at super-reading positions, on/inside pallets or items, free space scenarios, etc.).

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A reader device for reading information transmitted from a transponder via a backscatter signal generated by the transponder in response to a stimulus signal generated by the reader device, the reader device comprising:
a first power estimation unit configured to estimate a first power value indicative of power of the stimulus signal at a position of the transponder by evaluating power information included in the backscatter signal;
a second power estimation unit configured to estimate a second power value indicative of power of the backscatter signal at a position of the reader device;
a distance estimation unit configured to estimate a distance between the reader device and the transponder based on the first power value and the second power value, wherein the first power estimation unit is configured to estimate the first power value by evaluating the backscatter signal based on a predefined nonlinear transfer function of an available power versus modulation efficiency by which the stimulus signal is manipulated by the transponder or evaluating a clock rate of the backscatter signal manipulated by the transponder.

2. The reader device according to claim 1, wherein the second power estimation unit is configured to estimate the second power value by determining a received signal strength of the backscatter signal at a position of the reader device.

3. The reader device according to claim 1, wherein the distance estimation unit is configured to estimate the distance between the reader device and the transponder by applying a path-loss-model based on the first power value and the second power value.

4. The reader device according to claim 1, comprising:
a determination unit configured to determine whether the backscattering signal belongs to a communication between the reader device and the transponder based on the evaluated distance.

5. The reader device according to claim 4, comprising:
a decoding unit configured to determine information encoded in the backscattering signal upon determination, by the determination unit, that the backscattering signal belongs to a communication between the reader device and the transponder.

6. The reader device according to claim 1, comprising:
a determination unit configured to determine that the backscattering signal belongs to a communication between the reader device and the transponder when the evaluated distance is smaller than a predefined threshold distance.

7. The reader device according to claim 1, configured as a UHF long-range reader device.

8. A communication system, comprising a transponder for transmitting information to a reader device via a backscatter signal generated by the transponder in response to a stimulus signal generated by the reader device, the transponder comprising:
a backscatter signal generation unit configured to generate the backscatter signal based on the stimulus signal including power information indicative of the power of the stimulus signal at a position of the transponder; and
the reader device according to claim 1 for reading information transmitted from the transponder.

9. A transponder for transmitting information to a reader device via a backscatter signal generated by the transponder in response to a stimulus signal generated by the reader device, the transponder comprising:
a backscatter signal generation unit configured to generate the backscatter signal based on the stimulus signal including power information indicative of power of the stimulus signal at a position of the transponder, wherein the backscatter signal generation unit is configured to generate the backscatter signal either by manipulating the stimulus signal in accordance with a nonlinear transfer function of an available power versus modulation efficiency or by manipulating the stimulus signal with a clock rate in accordance with the power of the stimulus signal at a position of the transponder.

10. The transponder according to claim 9, wherein the transponder comprises one of the group consisting of a radio frequency identification tag and a contactless chip card.

11. A method of reading, by a reader device, information transmitted from a transponder via a backscatter signal generated by the transponder in response to a stimulus signal generated by the reader device, the method comprising:
estimating a first power value indicative of power of the stimulus signal at a position of the transponder by evaluating power information included in the backscatter signal by evaluating the backscatter signal based on a predefined nonlinear transfer function of an available power versus modulation efficiency by which the stimulus signal is manipulated by the transponder, or by evaluating a clock rate of the backscatter signal manipulated by the transponder;

estimating a second power value indicative of the power of the backscatter signal at a position of the reader device; and estimating a distance between the reader device and the transponder based on the first power value and the second power value.

12. A non-transitory computer-readable medium comprising instructions stored thereon which, when being executed by a processor cause a reader device to perform the method of claim 11.

* * * * *